United States Patent
Jansson

(10) Patent No.: US 7,363,118 B2
(45) Date of Patent: Apr. 22, 2008

(54) METHODS AND APPARATUS FOR REDUCING VEHICLE TIRE WEAR

(75) Inventor: Stefan B. Jansson, Kernersville, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 696 days.

(21) Appl. No.: 10/909,483

(22) Filed: Aug. 2, 2004

(65) Prior Publication Data

US 2006/0025895 A1    Feb. 2, 2006

(51) Int. Cl.
*G06F 17/00* (2006.01)
(52) U.S. Cl. ............................................ 701/1; 701/84
(58) Field of Classification Search .................... 701/1, 701/73, 84; 73/8; 180/201; 340/441–442
See application file for complete search history.

(56) References Cited

U.S. PATENT DOCUMENTS

| | | | |
|---|---|---|---|
| 3,621,955 A * | 11/1971 | Black et al. ................ | 192/3.57 |
| 3,971,595 A | 7/1976 | Kondo | |
| 4,327,414 A | 4/1982 | Klein | |
| 4,778,223 A | 10/1988 | Inoue | |
| 4,882,693 A * | 11/1989 | Yopp ............................ | 701/37 |
| 4,964,045 A | 10/1990 | Iwata et al. | |
| 4,985,838 A | 1/1991 | Hashiguchi et al. | |
| 4,993,729 A | 2/1991 | Payne | |
| 5,060,747 A * | 10/1991 | Eto ............................. | 180/197 |
| 5,090,511 A | 2/1992 | Kabasin | |
| 5,278,761 A | 1/1994 | Ander et al. | |
| 5,309,362 A | 5/1994 | Ito et al. | |
| 5,628,378 A | 5/1997 | Saito et al. | |
| 5,735,362 A | 4/1998 | Hrovat et al. | |
| 5,737,713 A | 4/1998 | Ikeda et al. | |
| 5,927,421 A | 7/1999 | Fukada | |
| 6,185,494 B1 | 2/2001 | Wadas | |
| 6,338,392 B1 | 1/2002 | Schmitt | |
| 6,412,886 B1 | 7/2002 | Abe et al. | |
| 6,431,557 B1 | 8/2002 | Terborn et al. | |
| 6,644,632 B1 | 11/2003 | Jaberg | |
| 2004/0134697 A1 | 7/2004 | Kobayashi et al. | |

FOREIGN PATENT DOCUMENTS

DE    102 31 728    10/2003

OTHER PUBLICATIONS

European Patent Office, PCT International Search Report for counterpart PCT/US2005/26654, Nov. 8, 2005.
European Patent Office, PCT Written Opinion for counterpart PCT/US2005/26654, Nov. 8, 2005.
European Patent Office, PCT International Preliminary Report on Patentability for counterpart PCT/US2005/26654, Feb. 15, 2007.

* cited by examiner

*Primary Examiner*—Yonel Beaulieu
(74) *Attorney, Agent, or Firm*—Potomac Patent Group PLLC

(57) ABSTRACT

A control system and method for minimizing tire wear on vehicles such as highway trucks and tractors determines a drive wheel torque limit based on an assumed tire/road friction coefficient and at least an estimated vehicle weight. The drive wheel torque limit is used to control engine torque applied to the drive wheels.

17 Claims, 3 Drawing Sheets

FIG. 3
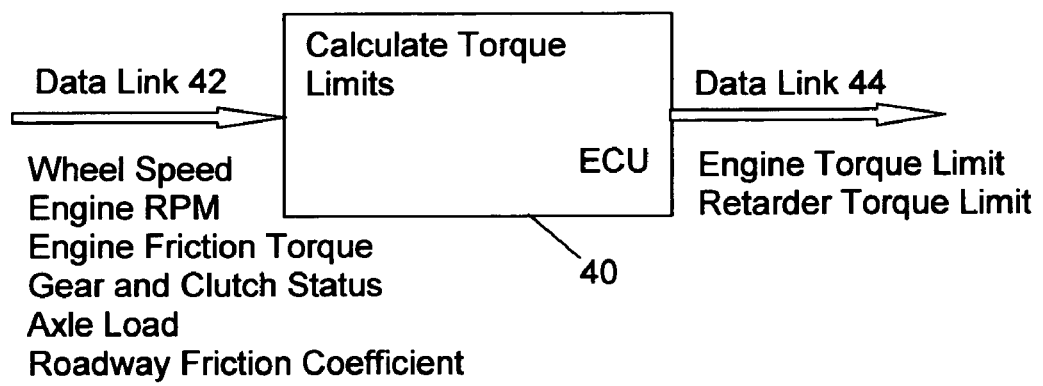
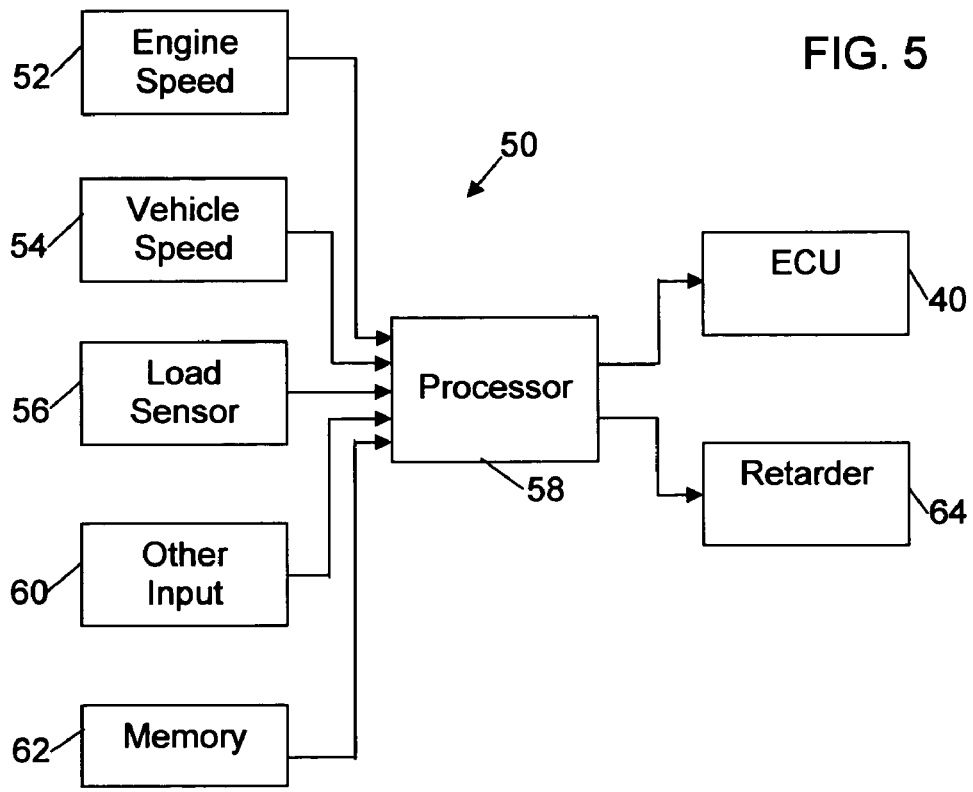
FIG. 5

METHODS AND APPARATUS FOR REDUCING VEHICLE TIRE WEAR

This invention relates to systems and methods of controlling a vehicle, especially a heavy vehicle such as a highway truck or a tractor, such that operation costs are reduced, in particular by controlling the vehicle's engine to reduce tire wear and fuel consumption.

BACKGROUND

In addition to its acquisition cost, a vehicle has operation costs that include, for example, fuel, tires, maintenance, repairs, and insurance. Vehicle owners and operators typically want to keep operation costs as low as possible, usually under the conditions that acceptable performance and safety can be attained.

Key elements of operation costs are tires, which are expensive, especially for heavy vehicles like over-the-highway trucks, and fuel, which can have many forms (e.g., gasoline, diesel fuel, hydrogen, electricity, etc.). Even small improvements in tire and fuel consumptions can have a large impact on lowering operation costs. If tires can be replaced less often, operation costs over a given time can be reduced. Fuel consumption depends on many factors, including for example engine efficiency, transmission losses, and tire characteristics. Over the years, fuel consumption has been reduced by new and more efficient oils that reduce the internal friction of the engine and transmission, by improved engine combustion that increases fuel efficiency, and by new tire tread designs and rubber compositions that reduce losses due to the tires.

A highway truck's maximum tractive force on a dry road is achieved at approximately 20% slip of the tires of the drive wheels. Prior art vehicle control systems, which include engine-torque control systems and traction control and anti-lock brake systems, aim to maximize tractive force or traction and do not address tire wear. For example, U.S. Pat. No. 5,737,713 to Ikeda et al. discloses a traction control system for adjusting engine torque based on an initial engine torque, acceleration, vehicle weight, axle weight, and gear ratio. U.S. Pat. No. 5,278,761 to Ander et al. discloses a method for vehicular wheel-spin control that adapts to different road traction characteristics, with the system adjusting engine torque in response to sensed conditions, including vehicle weight. U.S. Pat. No. 4,985,838 to Hashiguchi et al. discloses a traction control system for limiting engine torque based on vehicle weight, wheel speed, engine RPM, and transmission status. U.S. Pat. No. 4,964,045 to Iwata et al. discloses a traction control system associated with a vehicular brake system which can control braking force for respective individual driving wheels independently of each other on the basis of an average wheel slippage data. Engine torque may also be controlled.

There is room for improvement in controlling a vehicle to lower operation costs, especially for heavy vehicles.

SUMMARY

If a vehicle is controlled in the usual way to produce maximum tractive force, then the large slip allows high tire wear, which is minimal at zero or near-zero slip. Reducing drive-wheel slip can also have the benefit of reducing fuel consumption. Applicant's invention decreases tire wear and fuel consumption and reduces the operation cost of vehicles that are subjected to extensive tire slip. For example, Applicant's systems and methods lower the operation costs of heavy vehicles like highway trucks and tractors, prolonging their tire-replacement intervals and decreasing their energy consumption.

In one aspect of the invention, a control system for reducing wear of a drive wheel tire of a vehicle includes a control unit adapted to control torque generated by the vehicle's engine and applied to the drive wheel tire based on a variable torque limit value, and a device, in communication with the control unit, that determines a torque limit value based on a coefficient of friction between the drive wheel tire and a surface supporting the drive wheel tire and on a load carried by the drive wheel tire. The determined torque limit value corresponds to a drive wheel tire slip value of substantially zero. The determined torque limit value may correspond to a drive wheel slip of less than three percent and preferably less than 0.5 percent.

In another aspect of the invention, a method of reducing wear of a drive wheel tire of a vehicle includes the steps of collecting information corresponding to a load on an axle supporting the drive wheel tire; determining a torque limit at the drive wheel tire from at least the axle load and a coefficient of friction between the drive wheel tire and a surface supporting the drive wheel tire; determining at least one of an engine torque limit and a retarder torque limit based on the torque limit at the drive wheel tire; and using at least one of the engine torque limit as an upper limit on torque generated by the vehicle's engine and the retarder torque limit as an upper limit on torque dissipated by the vehicle's retarder, thereby reducing drive wheel tire slip to substantially zero. The method may further include the steps of collecting information corresponding to engine and vehicle speeds; estimating a driveline acceleration of the vehicle from engine speed changes; and determining a driveshaft-to-engine speed ratio based on the engine and vehicle speeds. The engine torque limit is then based on the torque limit at the drive wheel tire and the driveshaft-to-engine speed ratio.

BRIEF DESCRIPTION OF THE DRAWINGS

The various features, objects, and advantages of the invention will be apparent from reading this description in conjunction with the drawings, in which:

FIG. 3 is a block diagram of a vehicle control system;

FIG. 5 is a block diagram of an apparatus for controlling a vehicle.

DETAILED DESCRIPTION

The following description is in terms of a highway truck simply for convenience, and it will be understood that this invention is not limited to such trucks.

Applicant's systems and methods use information on the weight carried by a vehicle's drive axles and the operating conditions to determine an amount of torque that can be applied to the drive wheels without the tires' slipping significantly. This torque value may be used by the engine control system and/or by the engine and transmission braking systems as an upper limit of the torque that can be applied under the operating conditions. Thus, tire wear and fuel consumption are reduced.

Figure 1:
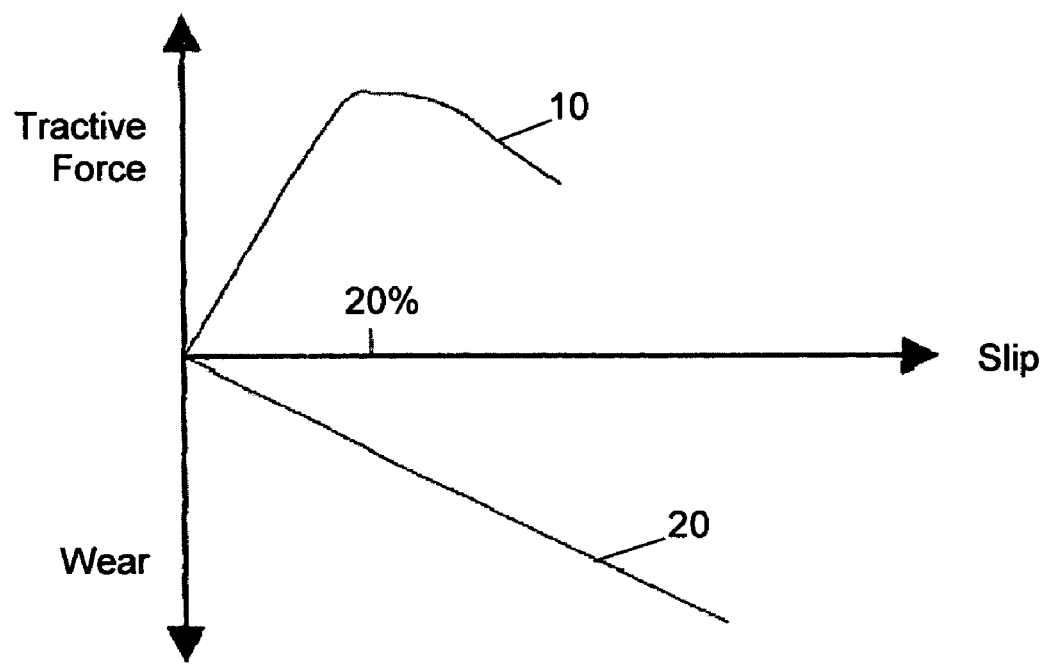
FIG. 1 is a graph showing tractive force and tire wear as functions of tire slip.

FIG. 1 is a graph that relates tractive force and tire wear (vertical axis) to tire slip (horizontal axis). Tractive force, wear, and slip increase in the directions of their respective arrows. In the graph, the slip value is a fraction having a numerator that is the difference between the tire's circumferential speed and the vehicle axle's horizontal translation and a denominator that is the tire's circumferential speed, expressed as a percentage. Thus, when the tire is rotating and the axle is horizontally motionless, the slip is 100%. As depicted by exemplary curve 10 for a typical truck, tractive force is maximal at a tire slip of about 20%, but at 20% slip, tire wear is greater than zero, increasing approximately linearly with increasing slip as depicted by exemplary line 20.

Prior systems are generally directed to achieving either maximum tractive force (for accelerating the vehicle as fast as possible) or maximum braking force, and thus prior systems aim for about 20% slip and do not target tire wear. In contrast, Applicant reduces tire wear and fuel consumption by controlling tire slip to be close to or substantially zero, e.g., less than a few percent or about 0-3%, and preferably less than 0.5%. According to the invention, a friction coefficient $\mu$ is assumed for given operating conditions, e.g., a dry road, and a maximum torque is determined based on the assumed friction coefficient. This maximum torque is communicated to the engine and retarder systems and used as an upper limit of the torque that these systems can permit to be applied under the given operating conditions. One effect of this control is reduction of tire wear. It will be appreciated that this control can have other effects, including for example reduction of fuel consumption.

Figure 2:
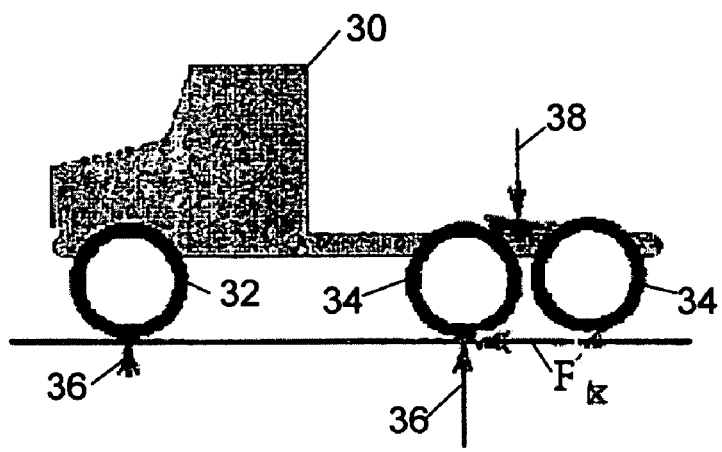
FIG. 2 is a schematic diagram that illustrates forces relating to tire slip in a vehicle, such as a highway truck.

FIG. 2 is a schematic diagram that illustrates forces relating to tire slip in a vehicle like an over-the-highway tractor 30 that has front wheels 32 and rear wheels 34. It will be understood that the wheels are disposed on axles (not shown), and only one of each set of wheels is seen in side view depicted in the figure. As is typical, one or both sets of rear wheels 34 are driven by an engine through a transmission of the tractor 30. In equilibrium, the road exerts forces (indicated by the vertical arrows 36) on the wheels that balance the respective component of the vehicle weight 38 on each wheel. These vertically operating forces 36, 38 determine the friction force $F_X$ that can be exerted on the drive wheels (indicated by the horizontal arrow in FIG. 2).

The maximal friction force $F_{Xmax}$ can be approximated by the following expression:

$$F_{Xmax} = \mu g (m_{load} + m_{rear})/N_{axles}$$

where $\mu$ is the friction coefficient between the drive wheel tires and the surface supporting the tires, g is the force of gravity, $m_{load}$ is the mass of the load supported by the drive axles, $m_{rear}$ is the mass of the truck supported by the drive axles, and $N_{axles}$ is the number of drive axles. The sum of $m_{load}$ and $m_{rear}$ is the load supported by the drive axles. As long as the force exerted by the tires in opposition to the friction force is less than $F_{Xmax}$, the tires do not slip, i.e., the slip is or is substantially 0%.

Of course, the force exerted by the tires in opposition to the friction force is generated by the vehicle's engine and retarders and reaches the tires through the transmission. The force F exerted by the tires due to the engine of a vehicle like a highway truck can be approximately expressed as:

$$F = (M_{engine} - M_{inertia}) \eta_{trans} \eta_{axle}/R_{wheel} N_{axles}$$

where $M_{engine}$ is the torque generated by the engine, $M_{inertia}$ is the torque dissipated by the engine and the driveline that transfers engine torque to the drive wheel, $\eta_{trans}$ is the gear ratio of the transmission transferring engine torque to the drive axles, $\eta_{axle}$ is the gear ratio of the drive axles transferring engine torque to the drive wheel tires, $R_{wheel}$ is the radius of the drive wheels, and $N_{axles}$ is the number of drive axles.

The force F is just the same as the friction force $F_X$ (although in the opposite direction). Thus, Applicant has recognized that it is advantageous to control F such that F is less than or approximately equal to $F_{Xmax}$ because doing so reduces tire wear. Applicant has also recognized that the force F can be controlled in different ways that are functionally equivalent although they may differ in the ease of their implementation. For example, if the engine torque $M_{engine}$ is not controlled, the force F can still be controlled by suitably varying the gear ratio of either or both of the transmission and drive axles and even, at least in principle, the radii of the drive wheels. Of course, controlling F by controlling the engine torque is preferable because doing so can provide the additional benefit of reduced fuel consumption.

In many modern vehicles, an engine's torque can be readily controlled through execution of suitable program instructions by the engine's electronic control unit. To control engine torque, the engine control unit ("ECU") receives a number of input data values, carries out a number of program steps using the input data, and provides a number of output data values to appropriate vehicle systems, such as fuel injectors, ignition timing, engine and wheel brakes, etc. FIG. 3 depicts an ECU 40 that receives input data values through a data link 42 and transmits output data values through a data link 44. To control the engine as described above, the ECU 40 or another suitable processor calculates torque limit values based on some or all of the input information. In particular, there may be calculated an engine torque limit value and a retarder torque limit value, which are values of an engine torque and an effective friction torque that, either separately or in combination, are just enough to ensure that the force F exerted by the tires is less than or about equal to the force $F_{Xmax}$. For simplicity, those of ordinary skill in this art will understand that a "torque limit value" in this application refers to either an engine torque limit value or a retarder torque limit value or a combination of them, according to the context.

A variety of equivalent input data values can thus be provided to the ECU 40, including at least the friction coefficient $\mu$ and the combined mass of the truck and load. The other values in the above expression for the forces $F_{XMAX}$ and F can be pre-stored as they will be known when the truck is manufactured. As depicted in FIG. 3, information on wheel speed, engine speed, which may be in revolutions per minute (RPM), inertia torque $M_{inertia}$, gear and clutch status, axle load, and friction coefficient are provided to the ECU 40. The status of the clutch can be of interest because while the clutch is disengaged, no engine torque can reach the drive wheels; although the clutch status does not affect the determination of the torque limit values, Applicant's engine control can be suspended while the clutch is disengaged. The axle load value and the friction coefficient value (and the other values, too, for that matter) may be provided to the ECU 40 by the driver through an input device such as a keypad or rotatable dial. Alternatively, the mass of the truck and the friction coefficient $\mu$ may be pre-stored in the ECU or in a memory device accessed by the ECU; the driver may enter the mass of the load; and the axle load may then be derived from the combined mass of the truck and load. A typical value of the friction coefficient is $\mu$=0.5 for a dry road. It will be appreciated that other friction coefficient values can occur under other operating conditions, for example when a road is wet or icy.

FIG. 3 depicts the torque limits as being transmitted as output values on data link 44, but it will be appreciated that this is not necessary; the engine torque limit may be determined and used within the ECU 40 to affect other control signals generated by the ECU 40 and transmitted to components, e.g., fuel injectors, that affect engine torque. Alternatively, the torque limits may be determined by a separate module and communicated to the ECU as depicted in FIG. 5, which is described below.

The combined mass of the truck and load may be estimated from measurements by one or more sensors on the vehicle. One suitable sensor would determine the load by measuring the pressure in an air suspension of the vehicle, enabling the measured pressure to be converted to load according to the proportional relationship between those parameters. Similarly, another suitable load sensor would measure a mechanical deflection of the vehicle's suspension. Air suspension systems and deflection measurement and adjustment systems are well known, and are described in, for example, U.S. Pat. No. 6,644,632 to B. Jaberg for "Air Spring Device for Load Carrying Vehicles"; U.S. Pat. No. 6,431,557 to B. Terborn et al. for "Driving Mode Ride Height Adjustment"; and U.S. Pat. No. 4,993,729 to J. Payne for "Vehicle Suspension". Yet another suitable sensor would determine the load from the vehicle's inertia, for example by measuring the vehicle's acceleration in response to one or more predetermined increments (up or down) of engine torque. Such acceleration measurements are easily carried out by wheel speed sensors that can measure wheel speed at two different times and processors that can convert the time differences and wheel speed measurements into acceleration values. It is currently believed that it may be easier to measure the mass or axle load by sensing the fluid (gas or liquid) pressure in the suspension system or by sensing the system's mechanical deflection.

Figure 4:
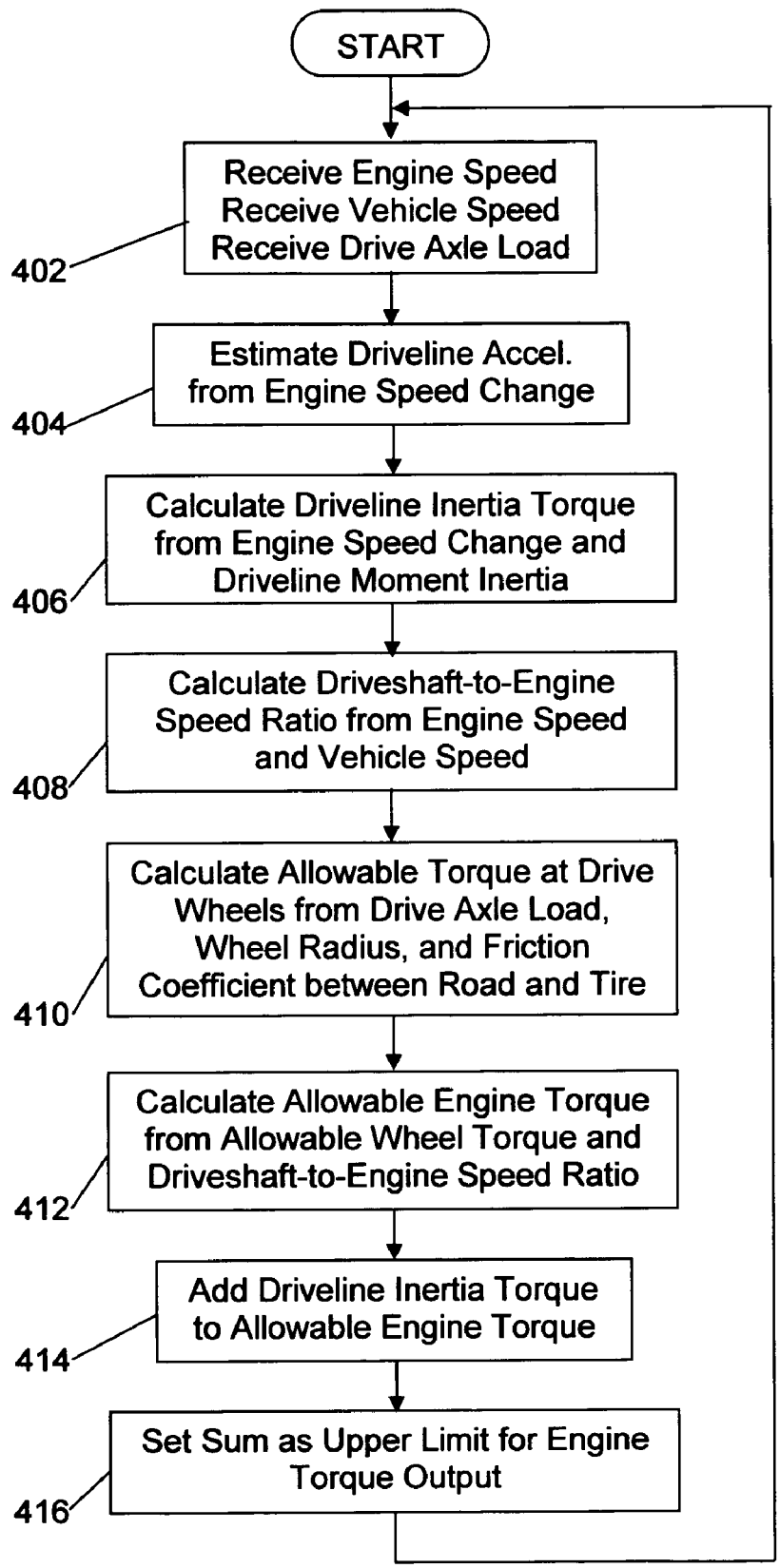
FIG. 4 is a flowchart of a method of controlling a vehicle.

FIG. 4 is a flowchart of steps that may be carried out by systems and methods in accordance with Applicant's invention. In step 402, indications of engine and vehicle speeds and axle load are received from vehicle sensors and/or driver input, and in step 404, an estimate of the vehicle's driveline acceleration may be derived from engine speed changes. In step 406, the driveline inertia torque may be determined from the engine speed changes and the driveline's moment of inertia. In step 408, a driveshaft to engine speed ratio may be calculated based on the engine and vehicle speeds, and in step 410, the torque limit at the drive wheels is determined from the axle load, number of drive axles, wheel radius, and coefficient of friction as described by the mathematical expressions above. In step 412, the engine torque limit is determined from the torque limit at the drive wheels and the current driveshaft-to-engine-speed ratio. Since in some vehicles, such as heavy trucks, the driveline inertia can be significant, step 414 shows adjusting the engine torque limit by adding to it the driveline inertia torque. The result is used (step 416) as an upper limit on the allowable engine torque that reduces wheel spin to less than a few percent, thereby increasing tire life and reducing fuel consumption. The process flow returns to step 402 as necessary to handle changes in the operating state of the vehicle, for example, shifts to different transmission gears.

It will be appreciated that it is not necessary to perform all of the steps indicated in FIG. 4. Many of the parameters indicated in FIG. 4 can be determined once, in a laboratory for example. These parameters include in particular the driveline inertia torque. As explained above, it may be enough to input only the vehicle weight, which can be readily transformed by appropriate arithmetic into axle load, and an estimate of friction coefficient in order to output a torque limit value. The estimated friction coefficient advantageously would reflect the road conditions experienced by the vehicle since a friction coefficient appropriate for a dry road would be significantly different from a friction coefficient appropriate for a snowy road.

FIG. 5 is a block diagram of an apparatus 50 for reducing vehicle tire wear in the manner described above. Suitable engine and vehicle speed sensors 52, 54 and a suitable load sensor 56 provide sensed information to a processor 58, such as a programmable microprocessor. The processor 58 manipulates the sensed information together with other information, including the coefficient of friction provided by a driver's or other input 60 and other vehicle information stored in a suitable memory 62, and determines engine and retarder torque limits that are provided to the ECU 40 and an engine or transmission retarder 64. It will be understood that the retarder 64 generates braking force, for example, from engine compression and expansion, increased exhaust backpressure, or increased hydraulic or electrical dissipation. Thus, a retarder can be considered as dissipating torque in the drive train.

It will be appreciated that procedures described above may be carried out repetitively as necessary to control a vehicle. To facilitate understanding, many aspects of the invention are described in terms of sequences of actions that can be performed by, for example, elements of a programmable computer system. It will be recognized that the various actions could be performed by specialized circuits (e.g., discrete logic gates interconnected to perform a specialized function or application-specific integrated circuits), by program instructions executed by one or more processors, or by a combination of both.

Moreover, the invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions. As used here, a "computer-readable medium" can be any means that can contain, store, communicate, propagate, or transport the program for use by or in connection with the instruction-execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM).

Thus, the invention may be embodied in many different forms, not all of which are described above, and all such forms are contemplated to be within the scope of the invention. For each of the various aspects of the invention, any such form may be referred to as "logic configured to" perform a described action, or alternatively as "logic that" performs a described action.

It is emphasized that the terms "comprises" and "comprising", when used in this application, specify the presence of stated features, integers, steps, or components and do not preclude the presence or addition of one or more other features, integers, steps, components, or groups thereof.

The particular embodiments described above are merely illustrative and should not be considered restrictive in any way. The scope of the invention is determined by the following claims, and all variations and equivalents that fall within the range of the claims are intended to be embraced therein.

What is claimed is:

1. A control system for reducing wear of a drive wheel tire of a vehicle, comprising:
    a control unit configured to control torque applied to the drive wheel tire based on a variable torque limit value;
    a device, in communication with the control unit, that determines the torque limit value based on a coefficient of friction between the drive wheel tire and a surface supporting the drive wheel tire and on a load carried by the drive wheel tire;
    wherein the determined torque limit value corresponds to a drive wheel tire slip value of substantially zero.

2. The control system of claim 1, wherein the determined torque limit value corresponds to a drive wheel slip value of less than three percent.

3. The control system of claim 2, wherein the determined torque limit value corresponds to a drive wheel slip of less than about 0.5 percent.

4. The control system of claim 1, wherein a torque generated by an engine of the vehicle is related to the determined torque limit value through wheel speed, engine speed, and a current drive ratio of a vehicle transmission transferring engine torque to an axle supporting the drive wheel tire.

5. The control system of claim 1, wherein a torque generated by an engine of the vehicle is related to the determined torque limit value according to:

$$(M_{engine} - M_{inertia})\eta_{trans}\eta_{axle}/R_{wheel} \leq \mu g(m_{load} + m_{rear})$$

in which $M_{engine}$ is the torque generated by the engine, $M_{inertia}$ is a torque dissipated by the engine and a drive train transferring engine torque to the drive wheel, $\eta_{trans}$ is a gear ratio of a transmission transferring engine torque to an axle supporting the drive wheel tire, $\eta_{axle}$ is a gear ratio of the axle transferring engine torque to the drive wheel tire, $R_{wheel}$ is a radius of the drive wheel tire, $\mu$ is the coefficient of friction between the drive wheel tire and the surface supporting the drive wheel tire, g is a force of gravity, $m_{load}$ is a mass of the load carried by the vehicle and supported by the drive wheel tire, and $m_{rear}$ is a mass of the vehicle supported by the drive wheel tire.

6. The control system of claim 5, wherein the mass of the load is determined by a sensor that measures a pressure in an air suspension of the vehicle.

7. The control system of claim 5, wherein the mass of the load is determined by a sensor that measures a mechanical deflection of a suspension of the vehicle.

8. The control system of claim 5, wherein the mass of the load is determined by a wheel speed sensor that measures vehicle acceleration in response to engine torque.

9. A method of reducing wear of a drive wheel tire of a vehicle, comprising the steps of:
    collecting information corresponding to a load on an axle supporting the drive wheel tire;
    determining a torque limit at the drive wheel tire from at least the axle load and a coefficient of friction between the drive wheel tire and a surface supporting the drive wheel tire;
    determining at least one of an engine torque limit and a retarder torque limit based on the torque limit at the drive wheel tire; and
    using at least one of the engine torque limit as an upper limit on torque generated by an engine of the vehicle and the retarder torque limit as an upper limit on torque dissipated by a retarder of the vehicle, thereby reducing drive wheel tire slip to substantially zero.

10. The method of claim 9, further comprising the steps of:
    collecting information corresponding to engine and vehicle speeds;
    estimating a driveline acceleration of the vehicle from engine speed changes; and
    determining a driveshaft-to-engine speed ratio based on the engine and vehicle speeds;
    wherein the engine torque limit is based on the torque limit at the drive wheel tire and the driveshaft-to-engine speed ratio.

11. The method of claim 10, further comprising the steps of determining a driveline inertia torque and adjusting the engine torque limit by adding the driveline inertia torque to the engine torque limit.

12. The method of claim 9, wherein at least some of the information is received from a vehicle driver.

13. The method of claim 9, wherein the engine torque limit corresponds to a drive wheel tire slip of less than about 0.5 percent.

14. The method of claim 9, wherein the engine torque limit is related to the torque limit at the drive wheel tire according to:

$$(M_{engine} - M_{inertia})\eta_{trans}\eta_{axle}/R_{wheel} \leq \mu g(m_{load} + m_{rear})$$

in which $M_{engine}$ is the torque generated by the engine, $M_{inertia}$ is a torque dissipated by the engine and driveline, $\eta_{trans}$ is a gear ratio of a transmission transferring engine torque to an axle supporting the drive wheel tire, $\eta_{axle}$ is a gear ratio of the axle transferring engine torque to the drive wheel tire, $R_{wheel}$ is a radius of the drive wheel tire, $\mu$ is the coefficient of friction between the drive wheel tire and the surface supporting the drive wheel tire, g is a force of gravity, $m_{load}$ is a mass of the load carried by the vehicle and supported by the drive wheel tire, and $m_{rear}$ is a mass of the vehicle supported by the drive wheel tire.

15. The method of claim 14, wherein the mass of the load is determined by measuring a pressure in an air suspension of the vehicle.

16. The method of claim 14, wherein the mass of the load is determined by measuring a mechanical deflection of a suspension of the vehicle.

17. The method of claim 14, wherein the mass of the load is determined by measuring vehicle acceleration in response to a predetermined increment of engine torque.

* * * * *